United States Patent [19]

Sakano

[11] Patent Number: 5,337,162
[45] Date of Patent: Aug. 9, 1994

[54] IMAGE PROCESSING APPARATUS FOR PREVENTING OCCURRENCE OF MOIRE IN OUTPUT IMAGE

[75] Inventor: Yukio Sakano, Fucyu, Japan
[73] Assignee: Ricoh Company, Ltd., Tokyo, Japan
[21] Appl. No.: 904,493
[22] Filed: Jun. 25, 1992
[30] Foreign Application Priority Data
  Jun. 30, 1991 [JP] Japan .................. 3-185375
[51] Int. Cl.⁵ .................................... H04N 1/23
[52] U.S. Cl. ............................ 358/458; 358/456; 340/71
[58] Field of Search .................. 358/465, 458, 282, 52, 358/53, 448, 458, 298, 456, 459, 429, 455, 457, 463, 466, 284

[56] References Cited

U.S. PATENT DOCUMENTS

| | | | |
|---|---|---|---|
| 4,468,704 | 8/1984 | Stoffel et al. | 358/282 |
| 4,731,863 | 3/1988 | Sezan et al. | 358/282 X |
| 4,912,569 | 3/1990 | Petilli | 358/465 |
| 4,984,097 | 1/1991 | Shu | 358/429 |
| 4,987,495 | 1/1991 | Arai | 358/448 |
| 5,055,942 | 10/1991 | Levien | 358/456 |

Primary Examiner—Paul Ip
Attorney, Agent, or Firm—Mason, Fenwick & Lawrence

[57] ABSTRACT

An image processing apparatus in which a multilevel image signal generated from an original image by a scanner is input and processed so as to produce multilevel image data describing a gray level of each pixel of an output image, includes a detection part for repeatedly detecting a peak of a multilevel image signal generated by a scanner and a valley thereof with respect to pixels of the original image aligned in a scanning direction of the scanner, and for outputting the peak of the multilevel image signal and the valley thereof, and a correction part for correcting a gray level of the multilevel image data with respect to each of the pixels depending on a difference between the peak and the valley, so as to reduce changes in gray level of pixels of the output image.

13 Claims, 9 Drawing Sheets

IMAGE PROCESSING APPARATUS FOR PREVENTING OCCURRENCE OF MOIRE IN OUTPUT IMAGE

BACKGROUND OF THE INVENTION

The present invention generally relates to an image processing apparatus, and more particularly to an image processing apparatus in which an undesired moire is prevented from occurring in an output image reproduced from a screened halftone image such as a photograph.

In digital copying machines or facsimile machines, a multilevel image signal is generated from an original image by a scanner having a CCD line sensor. The multilevel image signal is processed by an image processor so as to produce a set of picture elements describing a gray level of an output image to be copied, transmitted or received. When a multilevel image signal is generated from a dot area of an original image, it is known that the moire is likely to occur in the output image due to interference between the sampling frequency of the CCD line sensor and the dot frequency of the dot area, thus degrading the image quality. The original image is a composite image in which a dot image and a line image coexist. The dot image refers to a photograph or the like which is described by dots, while the line image refers to a character or the like which is described by lines.

Figure 1:
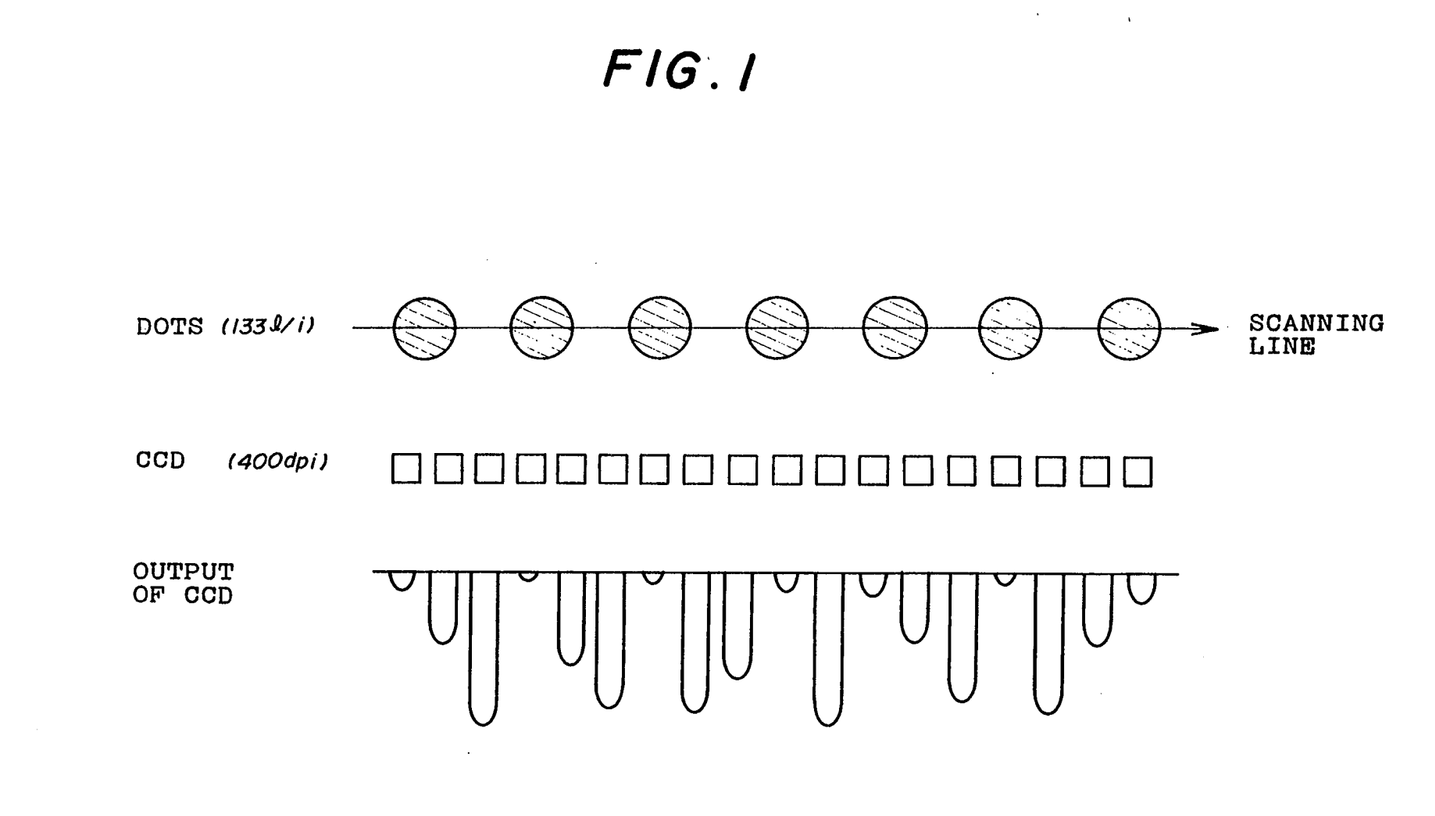
FIG. 1 is a diagram for explaining the occurrence of the moire due to interference between a sampling frequency and a dot frequency.

As an example, FIG. 1 shows a case where a multilevel image signal is generated from a screened halftone area having a dot frequency of 133 l/i (lines per inch) by a CCD line sensor having a sampling frequency of 400 dpi (dots per inch). As shown in FIG. 1, due to the interference between the sampling frequency and the dot frequency, the amplitude of the multilevel image signal periodically changes in spite of a uniform dot density of the original image.

Figure 2:
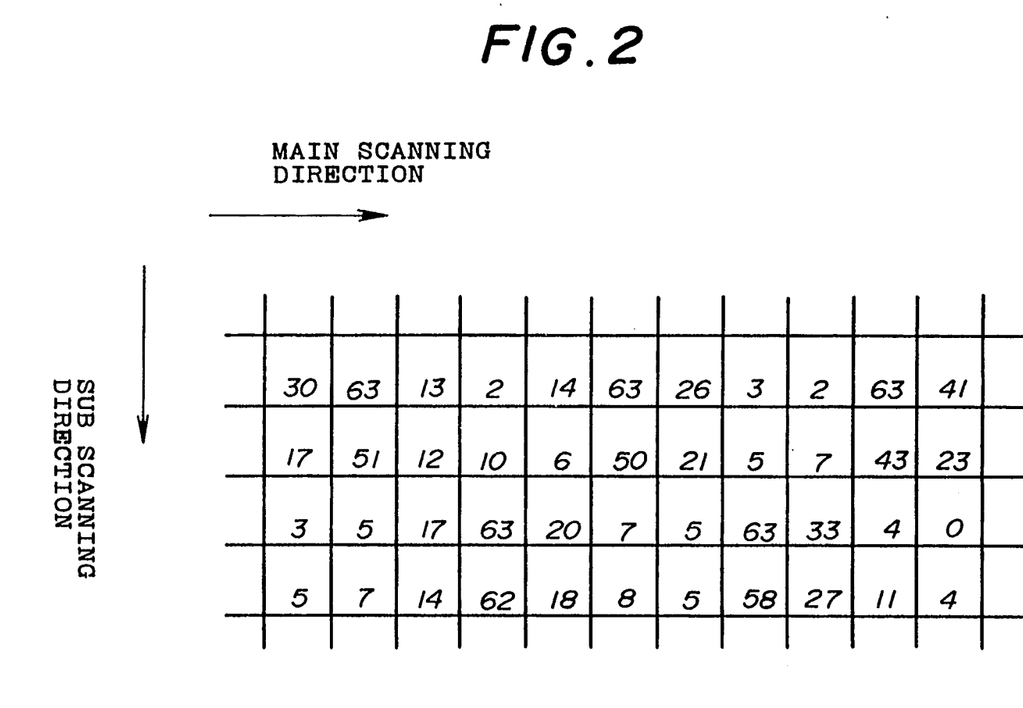
FIG. 2 is a diagram showing image data after the MTF correction is performed for an image signal generated from a dot image of uniform dot density.
Figure 3:
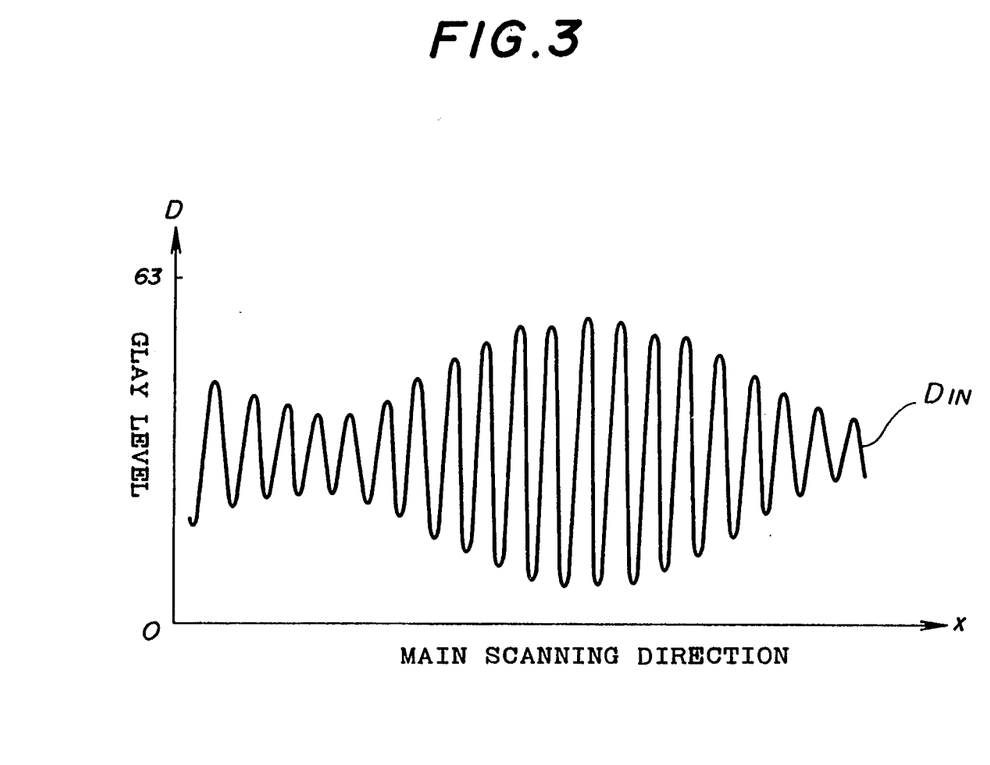
FIG. 3 is a diagram showing an undesired gray level pattern of an image signal generated by a scanner, the amplitude of this signal periodically changing in a scanning direction of the scanner.

FIG. 2 shows multilevel image data after a multilevel image signal generated from a screened halftone image of uniform dot density is processed through an MTF (modulation transfer function) correction. The multilevel image data represents a gray level of each pixel of a set of pixels aligned in the main scanning direction and in the sub scanning direction, and such a gray level is respectively indicated by a numeral within each partition (showing a pixel) in FIG. 2. It is difficult to appreciate the presence of the moire when the multilevel image data of FIG. 2 is partially viewed. However, if the changes in the gray level corresponding to pixels aligned along a scanning line of the scanner are viewed, it is apparent that the amplitude of a multilevel image signal periodically changes. FIG. 3 shows changes in gray level of a multilevel image signal Din, generated by the scanner having the CCD line sensor, with respect to pixels aligned in the main scanning direction. In FIG. 3, it is apparent that the moire occurs in the output image.

In an image processing apparatus, a smoothing process is performed for filtering of an image signal, and the MTF correction process is performed for sharpening an edge portion of an image or intensifying an edge portion thereof. It is known that the occurrence of the moire is reduced to a certain extent if the smoothing process is performed with respect to a local region of an image. However, there is a problem in that, if the smoothing process is performed for a composite image where a dot area such as a dot photograph and a line area such as a character coexist, the line area conversely becomes dim or blurs in the output image due to the smoothing process, thus degrading the picture quality. Moreover, it is known that the moire is also intensified in the output image if the MTF correction process is performed. Thus, it is desirable to prevent the moire from occurring in the output image even when the MTF correction process is performed.

SUMMARY OF THE INVENTION

Accordingly, it is a general object of the present invention to provide an improved image processing apparatus in which the above described problems are eliminated.

Another, more specific object of the present invention is to provide an image processing apparatus in which the moire is effectively prevented from occurring in an output image reproduced from a screened halftone area of an original image. Still another object of the present invention is to provide an image processing apparatus in which the occurrence of the moire in the output image is effectively reduced without seriously degrading the image quality. The above mentioned objects of the present invention are achieved by an image processing apparatus in which a multilevel image signal generated from an original image by means of a scanner is input and processed so as to produce multilevel image data describing a gray level of each pixel of an output image, which image processing apparatus including a detection part for repeatedly detecting a peak of the multilevel image signal and a valley thereof with respect to pixels of the original image aligned in a scanning direction of the scanner, and for outputting the detected peak of the multilevel image signal and the detected valley thereof, and a correction part for correcting a gray level of the multilevel image data with respect to each of the pixels depending on a difference between the peak and the valley output by the detection part, so as to reduce changes in gray level of pixels of the output image. According to the present invention, it is possible to effectively prevent the occurrence of the moire in an image reproduced from a screened halftone area of an original image. Also, it is possible to stably reduce the occurrence of the moire in the output image without seriously degrading the image quality. A moire correction process according to the present invention is performed when a screened halftone area is detected. When a non-screened halftone area is detected the moire correction process is not performed, thus causing no undesired influence on the output image.

Other objects and further features of the present invention will become more apparent from the following detailed description when read in conjunction with the accompanying drawings.

DESCRIPTION OF THE PREFERRED EMBODIMENTS

Figure 4:
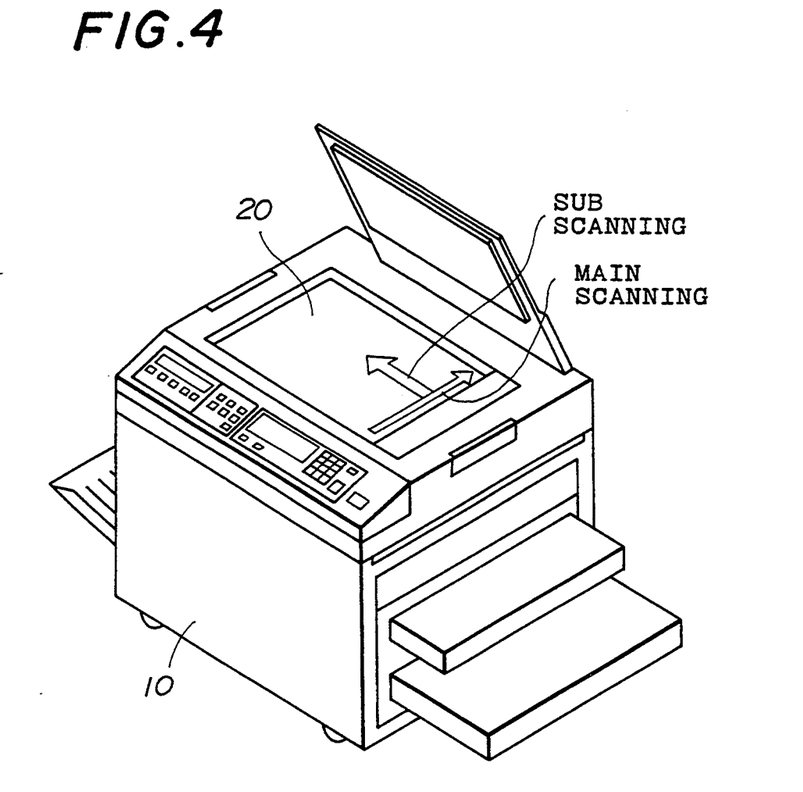
FIG. 4 is a view showing a digital copier to which the present invention is applied.

A description will now be given of an embodiment of an image processing apparatus according to the present invention, with reference to FIGS. 4 and 5. FIG. 4 shows a digital copier 10 to which the image processing apparatus of the invention is applied. This digital copier 10 includes a document platform 20. In this digital copier 10, a document (not shown) being placed in the document platform 20 is scanned by a line sensor (not shown) so as to produce an image described by a number of picture elements having a dot density of 400 dpi from an original image of the document. The scanning of the document is photoelectrically performed by the line sensor in a main scanning direction, the line sensor having charge-coupled devices (CCDs) aligned in the main scanning direction. Since the line sensor is automatically moved in relation to the document in a sub scanning direction perpendicular to the main scanning direction, the document is also scanned in this sub scanning direction due to the relative movement of the line sensor and the document.

Figure 5:
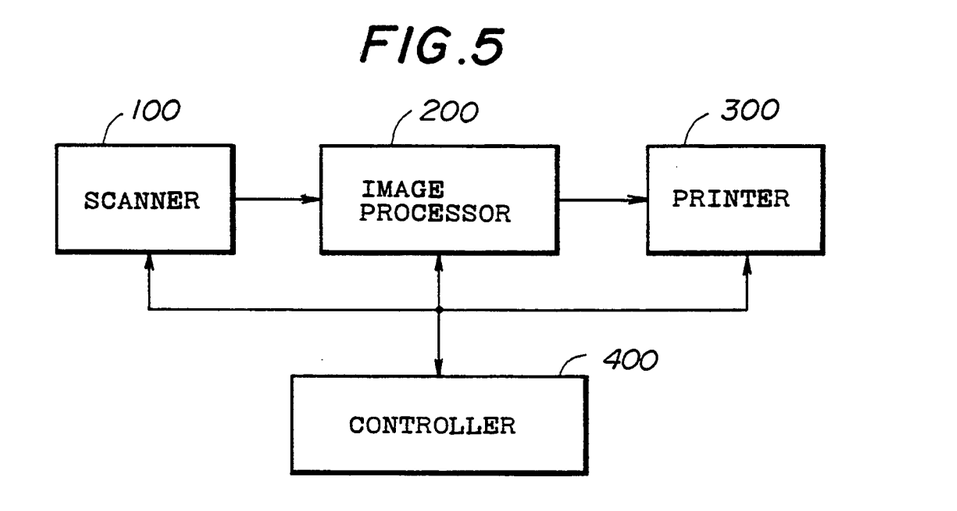
FIG. 5 is a block diagram showing the functional construction of the digital copier of FIG. 4.

FIG. 5 shows the construction of the digital copier 10 in which a copied image is generated from an original image of a document. In FIG. 5, a scanner 100 includes the line sensor described above, an amplifier, and an AD converter. An image signal indicating pixels is generated from the original image by the CCD line sensor of the scanner 100, this image signal is amplified by the amplifier, and it is converted into a digital signal by the AD converter. Each pixel indicated by the image signal is quantized in the scanner 100, and 6-bit data of each pixel representing 0th through 63rd gray levels (a total of 64 levels) is supplied to an image processor 200.

After the image signal is received from the scanner 100, an image processor 200 performs several processes, including a black and white process, a shading correction process, and an MTF (modulation transfer function) correction process. In the black and white process, a white pixel is transformed into the 0th gray level, and a black pixel is transformed into the 63rd gray level. In addition to the above processes, the image processor 200 performs a correction process in which the occurrence of the moire is prevented in an output image indicated by the image data. According to the present invention, image data for which the above correction process is performed is supplied by the image processor 200 to a printer 300.

The printer 300 is a laser beam printer performing an electrophotographic process to output a copied image onto a copy sheet at a dot density of 400 dpi in accordance with the data supplied by the image processor 200. A controller 400 controls the operation sequence of the scanner 100, the image processor 200 and the printer 300.

Figure 6:
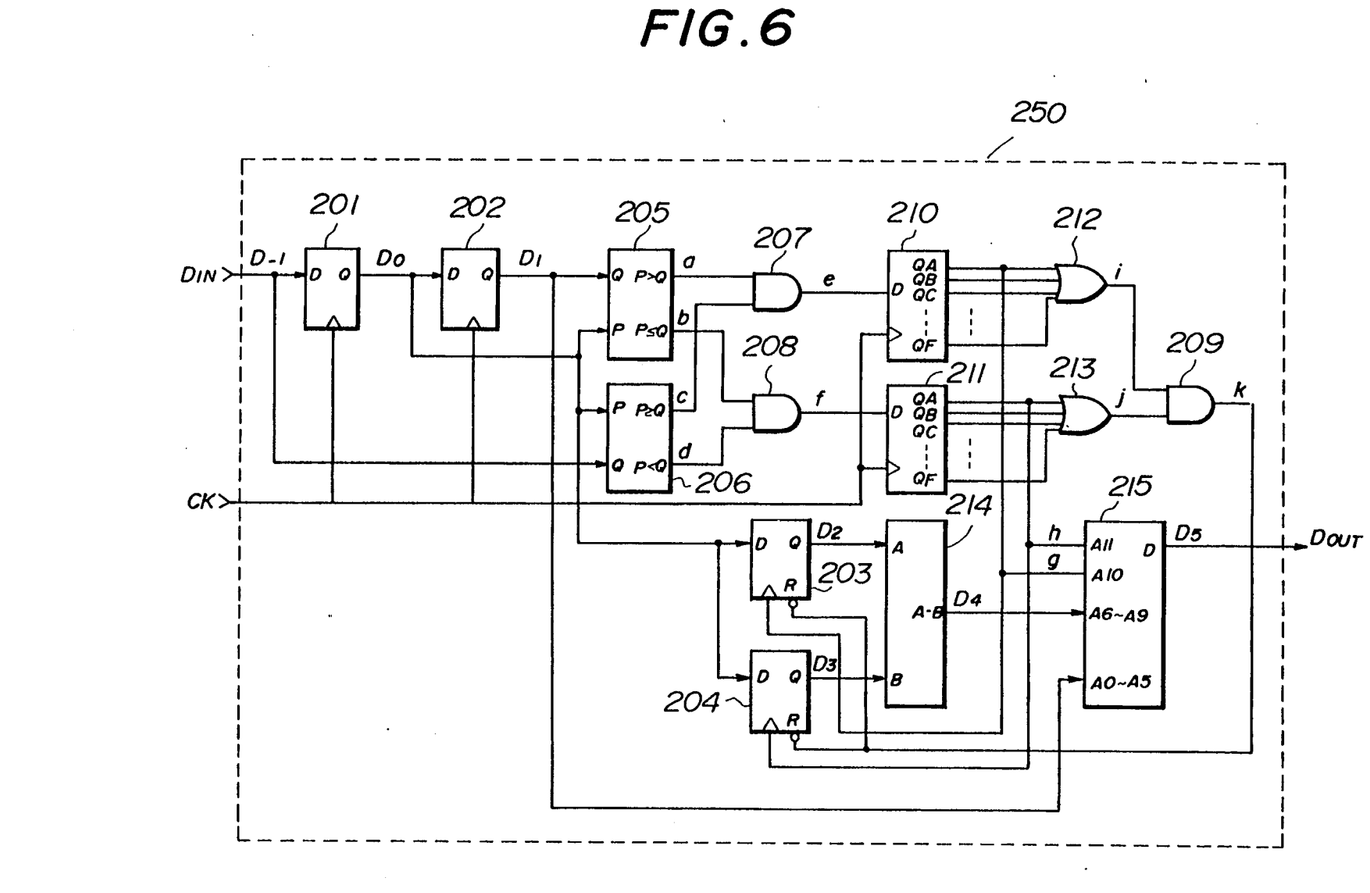
FIG. 6 is a diagram showing a first embodiment of a correction part of the present invention.

FIG. 6 shows a first embodiment of a correction part 250 provided in the image processor 200 of FIG. 5, and this correction part 250 performs the moire correction process in which the occurrence of the moire is reduced in an image indicated by an output signal Dout. A signal Din indicating image data supplied by the scanner 100 and a clock signal CK are input to this correction part 250, and the signal Dout indicating image data after the moire correction process. In FIG. 6, this correction part 250 includes four latch circuits 201, 202, 203, 204, two comparators 205, 206, three AND circuits 207, 208, 209, two 6-bit shift registers 210, 211, two 6-input OR circuits 212, 213, a subtracter 214, and a ROM (read only memory) 215.

Each of the latch circuits 201 through 204 has a port to which the clock signal CK is input, a port D to which a data signal is input, and a port Q from which a data signal is output. Two successive pixels indicated by the signals D0 and D1 are temporarily stored in the latch circuits 201 and 202 in synchronism with the clock signal CK being supplied to the latch circuits. Each of the latch circuits 203 and 204 has a synch port to which a synch signal described below is supplied, and a reset port R to which a reset signal described below is supplied.

Each of the comparators 205 and 206 compares a value of data input to its port P with a value of data input to its port Q. The comparator 205 outputs either a 1-bit high-level signal "a" when $P>Q$ or a 1-bit high-level signal "b" when $P \leq Q$. The comparator 206 outputs either a 1-bit high-level signal "c" when $P \geq Q$, or a 1-bit high-level signal "d" when $P>Q$. The subtracter 214 receives 6-bit data input to its ports A and B, and outputs a 4-bit data, indicated by four higher-order bits of difference data "A - B" between the two 6-bit input data, from its port (A - B). The ROM 216 stores a set of prescribed correction data, and outputs 6-bit data of such prescribed correction data from its port D in accordance with address data being indicated by address signals input to ports A0 through A11. In FIG. 6, the signals D(-1), D0, D1, D2, D3 and D5 indicate 6-bit illuminance data (representing 64 gray levels of each pixel), the signal D4 indicate 4-bit address data, and the signals "a", "b", "c", ..., "k" indicate 1-bit data, respectively.

The comparators 205 and 206, and the AND circuit 207 constitute a peak detector for detecting a peak of an image signal. When the image signal D0 indicates a value of the peak of the image signal, the AND circuit 207 outputs a signal "e" at high level "1" to the shift register 210. The comparators 205 and 206, and the AND circuit 208 constitutes a valley detector for detecting a valley of an image signal. When the image signal D0 indicates a value of the valley of the image signal, the AND circuit 208 outputs a signal "f" at high level "1" to the shift register 211.

The shift register 210 and the OR circuit 212 constitute a first delay circuit, and the shift register 211 and the OR circuit 213 constitute a second delay circuit. The first delay circuit outputs a signal "i" at high level "1" to the AND circuit 209 when a peak level is detected in six successive pixels of image data adjacent to the target pixel. The signal "e" is repeatedly supplied to the shift register 210 for a time period during which signals corresponding to the six successive pixels are supplied to the OR circuit 212. The second delay circuit outputs a signal "j" at high level "1" to the AND circuit 209 when a valley level is detected in the six successive pixels of image data adjacent to the target pixel. The signal "f" is repeatedly supplied to the shift register 211 for a time period during which signals corresponding to the six successive pixels are supplied to the OR circuit 213.

Therefore, the AND circuit 209 outputs a signal "k" at high level "1" when either the signal "i" at high level "1" or the signal "j" at high level "1" is received. In other words, if either the peak value or the valley value appears in the six successive pixels, the AND circuit 209 outputs the signal "k" at high level "1". This signal "k" serves to indicate an effective time period during which the moire correction process is performed. When the signal "k" at high level "1" is output, it is allowed to perform the moire correction process. On the other hand, when the signal "k" at low level "0" is output, the latch circuits 203 and 204 are reset to zero, and the moire correction process is not performed. The signal "k" at high level "1" is not likely to occur when an image processing with respect to the line area such as a character is performed for a time period during which signals corresponding to six successive pixels are supplied to the OR circuit 212 or 213. The signal "k" at high level "1" is stably and easily generated when an image processing with respect to the dot area such as a dot photograph is performed for a time period during which signals corresponding to six successive pixels are supplied to the OR circuit 212 or 213.

The latch circuit 203 is a peak storage device for storing the signal D1 in synchronism with a signal "g" received from the shift register 210. The latch circuit 204 is a valley storage device for storing the signal D0 in synchronism with a signal "h" received from the shift register 211. As described above, the signal "e" at high level "1" or the signal "f" at high level "1" occurs when the signal D0 indicates a value of the peak of the image signal or a value of the valley thereof, respectively. Thus, the signal "g" at high level "1" is supplied to the latch circuit 203 when the signal D1 indicates a value of the peak of the image signal, and when the signal D1 indicates a value of the valley of the image data, the signal "h" at high level "1" is supplied to the latch circuit 204. In addition, the above described signal "k" is supplied to a reset port R of each of the circuits 203 and 204. When the signal "k" at high level "1" is received, the corresponding latch circuit performs the signal storage action, and the corresponding latch circuit is reset to zero when the signal "k" at low level "0" is received. When the latch circuits 203 and 204 are reset, neither the peak value nor the valley value is stored in the circuits 203 and 204 (D2="0", D3="0"). In this case, the subtracter 214 outputs the 4-bit data (D4=A - B=D2 - D3="0") to the ROM 215. When the 4-bit data D4 indicating zero value is received at the ports A6 to A9, the ROM 215 supplies the signal D5 indicating the data indicated by the signal D1 from the output port. Thus, when the signal "k" at low level "0" is supplied as the reset signal, the input image signal is not subjected to the moire correction process and the output signal Dout with no correction is supplied to the printer 300.

The 4-bit data supplied by the subtracter 214 indicates a value of the difference between the peak value and the valley value (D4=A - B=D2 - D3). This value D4 of the difference between the peak and valley values represents a peak-to-peak amplitude of the image signal. A set of output data predetermined in accordance with the value D4 of the peak difference, which data is a function of the data input to the ports A6 to A9, is stored in the ROM 215. Thus, the correction part 250 outputs the signal Dout, indicating image data after the moire correction process is performed, from the ROM 215 in accordance with the signal applied to the ports A6 to A9. In order to decrease the required storage capacity, the ROM 215 outputs only the 4-bit data indicated by four higher-order bits of the difference data "A−B". The difference data D4 indicating zero value "0" is always output from the ROM 215 when the value of the peak difference (A−B) is smaller than zero (D4=0 when A−B<0).

A set of correction data D, being predetermined as a function of the image data D1, input to the lower-order address ports A0 to A5 of the memory 215 and as a function of the image data D4, input to the higher-order address ports A6 to A9 thereof, is stored in the ROM 215. In addition, the signal "g" is supplied to the port A10 of the memory 215, and the signal "h" is supplied to the port A11 thereof. The correction data D is also a function of the levels of the signals "g" and "h". Generally, the correction data D, stored in the ROM 215, is represented as the function of D1, D4, g, and h, as follows.

$$D = F(D1, D4, g, h) \quad (1)$$

In this formula, the signal "g" provides information as to whether or not the address signal D1 (input to the memory ports A0 to A6) corresponds with the peak level of the image data, and the signal "h" provide information as to whether or not the address signal D1 corresponds with the valley level of the image data. In the present embodiment, the signal D5 (=Dout) after the moire correction process is performed with respect to the signal D1 is generated from the ROM 215 only when either the signal "g" at high level "1" or the signal "h" at high level "1" is input to the ROM 215. The set of prescribed correction data, derived from a correction function described below, is stored in the ROM 215.

The output signal Dout of the correction part 250 of the present invention is represented by the following formula, by assuming in the above formula (1) that D=D5=Dout, D1=Din, g=e, h=f, and D4=D2 - D3=dp (dp: a peak-to-peak amplitude of image data):

$$Dout = F(Din, dp, e, f) \quad (2)$$

More specifically, in the present embodiment, the following correction functions a) through c) are used.

a) Dout=Din+64 /(dp+8). when Din≧8, dp≧4, e=1
b) Dout=Din−64 /(dp+8) when Din≦56, dp≧4, f=1
c) Dout=Din when Din, dp, e and f are in conditions other than in a) and b) above (3)

Figure 7:
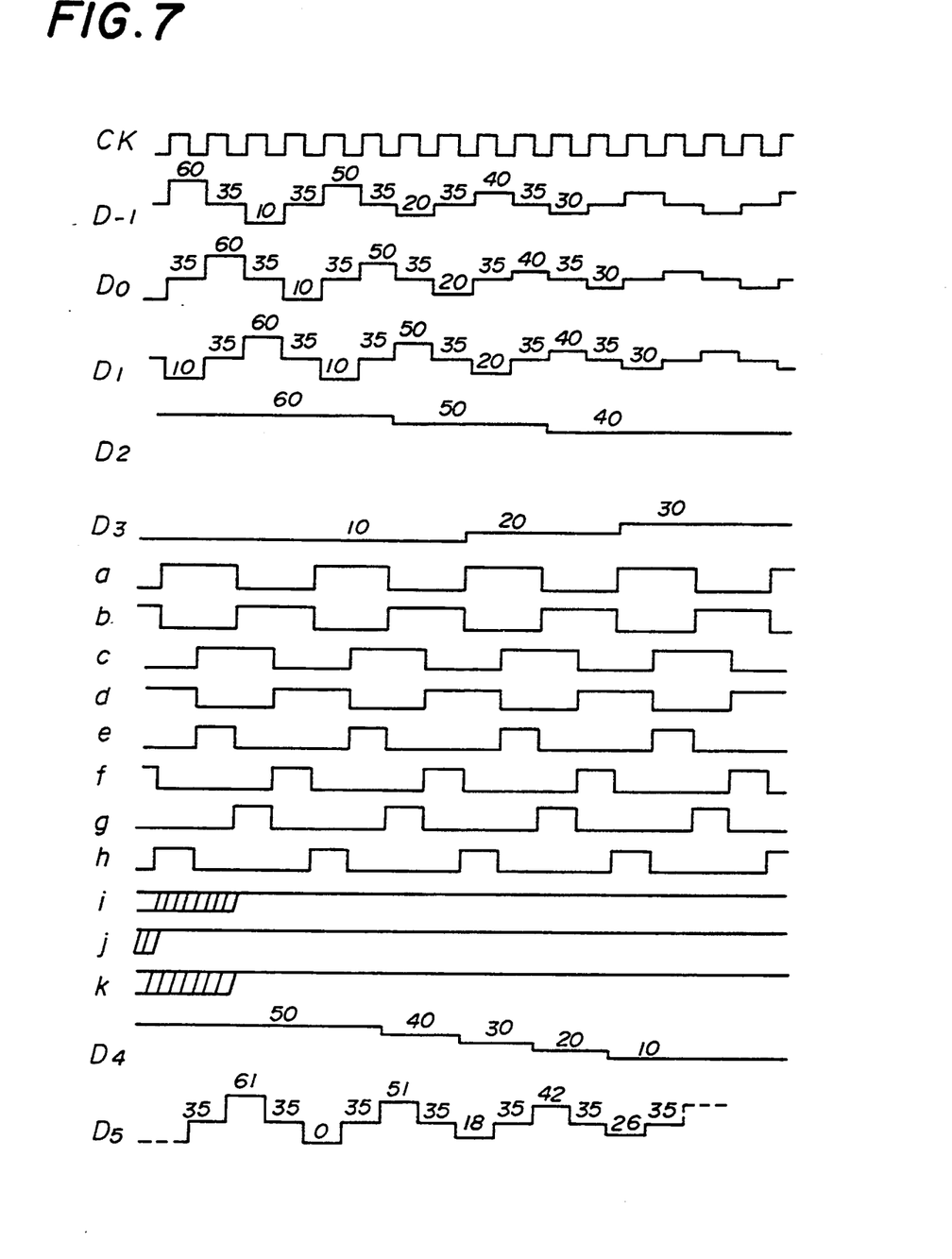
FIG. 7 is a time chart for explaining operations performed by the correction part of FIG. 6.

FIG. 7 shows the operations performed by the correction part 250 of FIG. 6. The output signal Dout=D5 is generated from the input signal Din=D(−1) as the result of the moire correction process performed by the correction part 250. As shown in FIG. 7, the peak values of the input image signal are converted into those of the output image signal in accordance with the value of the peak-to-peak amplitude of image data indicated by successive pixels adjacent to the target pixel.

Figure 8:
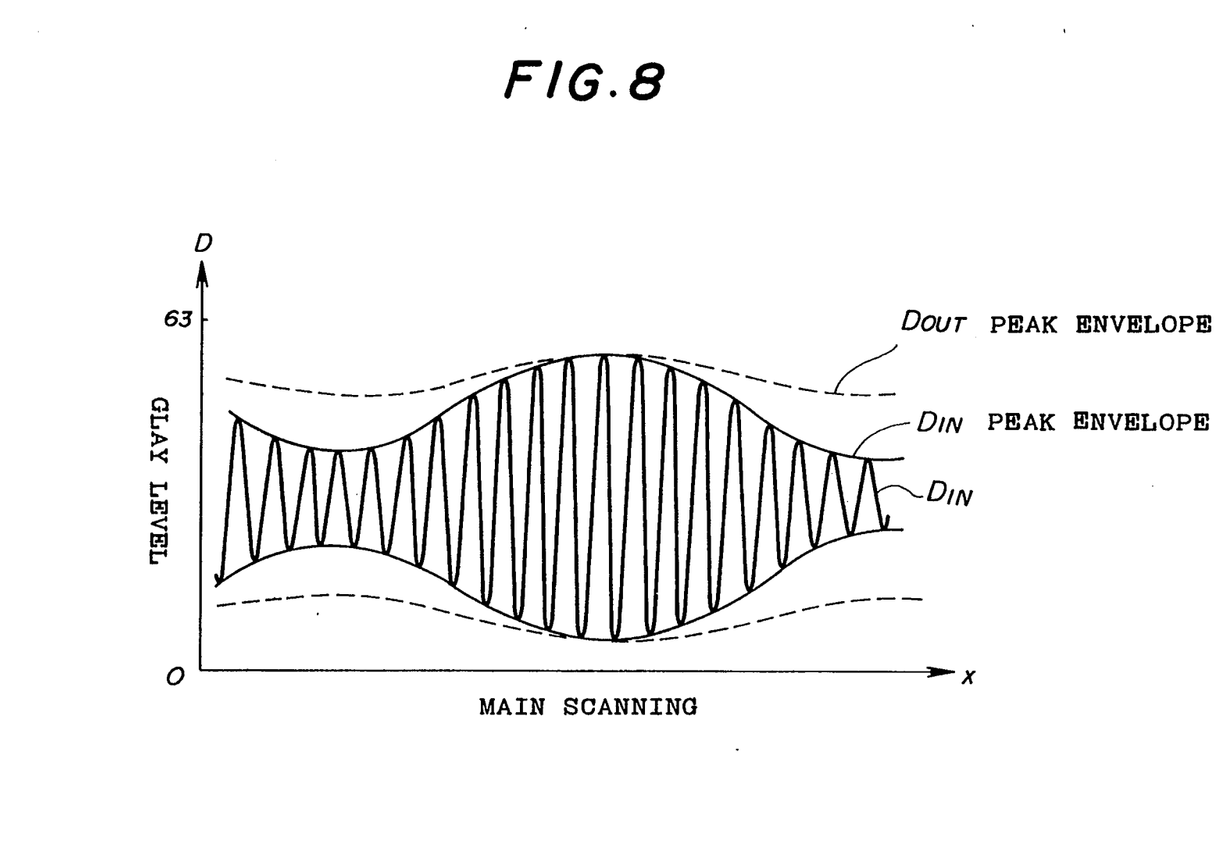
FIG. 8 is a chart for explaining the result of a moire correction process performed by the correction part of FIG. 6.

FIG. 8 shows the result of the moire correction process performed by the correction part 250. As shown in FIG. 8, the input image signal Din, obtained by the scanner 100 from a screened halftone area of an original image, has a gray level pattern ("Din Peak Envelope") whose amplitude periodically changes in the main scanning direction, as indicated by a solid line of FIG. 8 ("Din Peak Envelope"). Such changes in the input image signal will result in undesired moire patterns in the output image. On the other hand, the output image signal Dout, generated through the moire correction process of the present invention, shows a relatively small change in the gray level of the image data in the main scanning direction, as indicated by a dotted line of FIG. 8 ("Dout Peak Envelope"). The peak values of the input signal Din are corrected depending on the value of the peak-to-peak amplitude "dp" through the moire correction process. The smaller the magnitude of the peak-to-peak amplitude is, the greater the correction amount between the peak value of the input signal and the corrected peak value of the output signal is. In other words, the correction amount is in inverse proportion to the value of the peak difference (the peak-to-peak amplitude) between the peak value and the valley value of the input signal Din. Since an output image such as a copied image is reproduced depending on the output signal Dout, the moire is eliminated in the output image.

In the first embodiment, the moire correction process is performed depending on the value of the peak difference of the input signal, and it is possible to reduce the occurrence of the moire in the output image without seriously damaging the appearance of the output image. Also, in the first embodiment, the effective time period for performing the moire correction process is preset in order to minimize undesired influences on the quality of the output image due to the moire correction being performed with respect to the screened halftone area of the input image. Thus, the occurrence of the moire in the output image is effectively prevented.

In the above mentioned embodiment, the formula (3) is used as the moire correction function to define what is represented by the output signal Dout, but the present invention is not limited to this embodiment. For example, a) Dout=Din+(A−dp/2) when Din≦10, dp>6, e=1
b) Dout=Din−(A−dp/2) when Din>52, dp≦6, f=1
c) Dout=Din when Din, dp, e and f are in conditions other than in a) and b) above  (4)

may be used instead of the formulas (3) above. In the formulas (4), A is a predetermined coefficient.

In addition, it is also possible that the value of the input image signal is corrected depending on the value of a difference between a peak level and the average with respect to gray levels of pixels in a local area of the original image, or depending on the value of a difference between a peak level and a local smoothing value. In the first embodiment, the image data is corrected depending on the peak-to-peak amplitude with respect to a set of pixels aligned in the main scanning direction. However, it is also possible that the image data correction is performed depending on the peak-to-peak amplitude with respect to the sub scanning direction, or depending on the peak-to-peak amplitude with respect to both the main scanning direction and the sub scanning direction.

Figure 9:
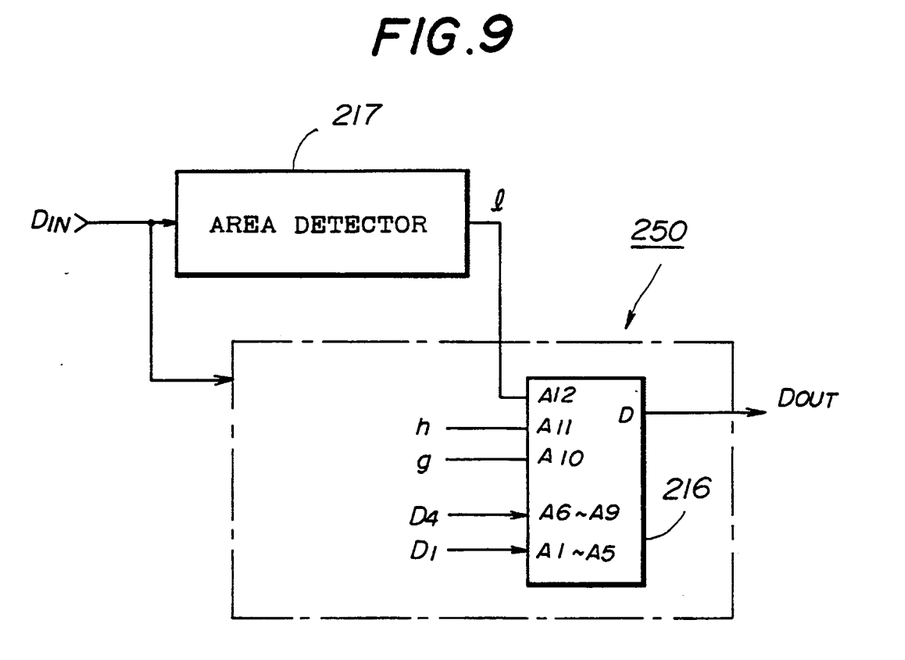
FIG. 9 is a diagram showing a second embodiment of the correction part according to the present invention.

Next, a description will be given of a second embodiment of the correction part according to the present invention, with reference to FIG. 9. FIG. 9 shows a correction part 250 provided with an area detector 217. In FIG. 9, the components of this correction part 250 are essentially the same as those of the correction part 250 shown in FIG. 6 except that a different ROM 216 is provided therein. In addition to the ROM 215 shown in FIG. 6, this ROM 216 further includes an address port A12 to which a signal "1" is supplied by the area detector 217. After the input image signal Din is received from the line sensor, the area detector 217 detects whether or not the pixel indicated by the signal Din is included in a screened halftone area of an original image. If the pixel indicated by the signal Din is a part of the screened halftone area, the signal "1" at high level "1" is input to the port A12 of the memory 216. If the pixel indicated by the signal Din is not a part of the screened halftone area, the signal "1" at low level "0" is input to the port A12 of the memory 216. In this embodiment, a known technique of screened halftone area detection is used. Such a technique is the subject of a transaction entitled "Segmentation Method for Documents Containing Text, Screened Halftone, Continuous Halftone" (S. Ohuchi et al.) issued on Jul. 27, 1990 by Institute of Electronics, Information Processing and Communication Society of Japan.

When the signal "1" at high level "1" is received at the port A12, the ROM 216 supplies an output signal Dout in accordance with the above mentioned formula (2) (Dout-F (Din, dp, e, f)). When the signal "1" at low level "0" is received at the port A12, the ROM 216 supplies an output signal Dout without performing the moire correction process (Dout=Din). In the ROM 216, the prescribed correction data according to the formula (2) is stored at the corresponding address when the port A12="1", and the data (Dout=Din) is stored at the corresponding address when the port A12="0". Thus, in this embodiment, it is possible that, only when a screened halftone area of an original image is detected by the area detector 217, the correction part 250 performs the moire correction process, and that it does not perform the same process when a non-screened halftone area (or, an area of a different kind) is detected.

In a case where the above described moire correction process is performed for all the areas of the original image, unnecessary data correction processing is performed for a non-screened halftone area of an original image, thereby degrading the quality of the reproduced image. According to the second embodiment, it is possible to effectively reduce the occurrence of the moire in the reproduced image without seriously degrading the quality of the reproduced image because the moire correction process is performed only for the screened halftone area.

In the second embodiment, the performance of the moire correction process by the correction part is determined depending on the level of the signal "1" supplied by the area detector. However, the present invention is not limited to this embodiment. It is also possible that the performance of the above process be determined depending on the gray level of the image data, and also possible that the performance of the above process be determined by an operator's instruction manually given from an operation part.

Figure 10:
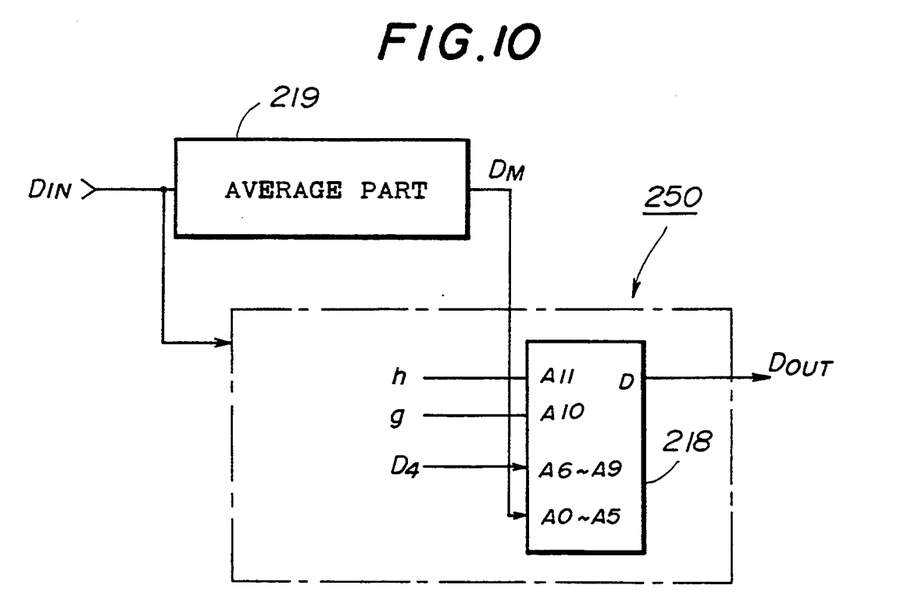
FIG. 10 is a diagram showing a third embodiment of the correction part according to the present invention.

Next, a description will be given of a third embodiment of the correction part according to the present invention, with reference to FIG. 10. FIG. 10 shows a correction part 250 provided with an average part 219. In FIG. 10, the components of the correction part 250 are essentially the same as those of the correction part 250 shown in FIG. 5 except that a different ROM 218 is provided therein. This ROM 218 includes address ports A0 to A5 to which a signal Dm is supplied by the average part 219. The average part 219 of this embodiment calculates an average value of gray levels of a set of six successive pixels aligned in the main scanning direction, and outputs a 6-bit signal Dm indicating the calculated average value to the address ports A0 to A5 of the ROM 218. In the third embodiment, the peak value of the input image signal is corrected depending on the magnitude of the peak-to-peak amplitude and on the average value indicated by the Dm. The smaller the magnitude of the peak-to-peak amplitude, the greater the correction amount between the peak value of the input image signal and the corrected peak value of the output image signal. In other words, the correction amount is in inverse proportion to the value of the difference (the peak-to-peak amplitude) between the peak value and the valley value in the input image. In the third embodiment, in order to effectively reduce the occurrence of the moire in the output image, the moire correction process is performed by using a) Dout=Dm+(A−dp/2) when Dm≧10, dp 6, e=1
b) Dout=Dm−(A−dp/2) when Dm≦52, dp≧6, f=1
c) Dout=Dm when Dm, dp, e and f are in conditions other than in a) and b) above (5)

In the formulas (5) above, A is a predetermined coefficient.

Figure 11:
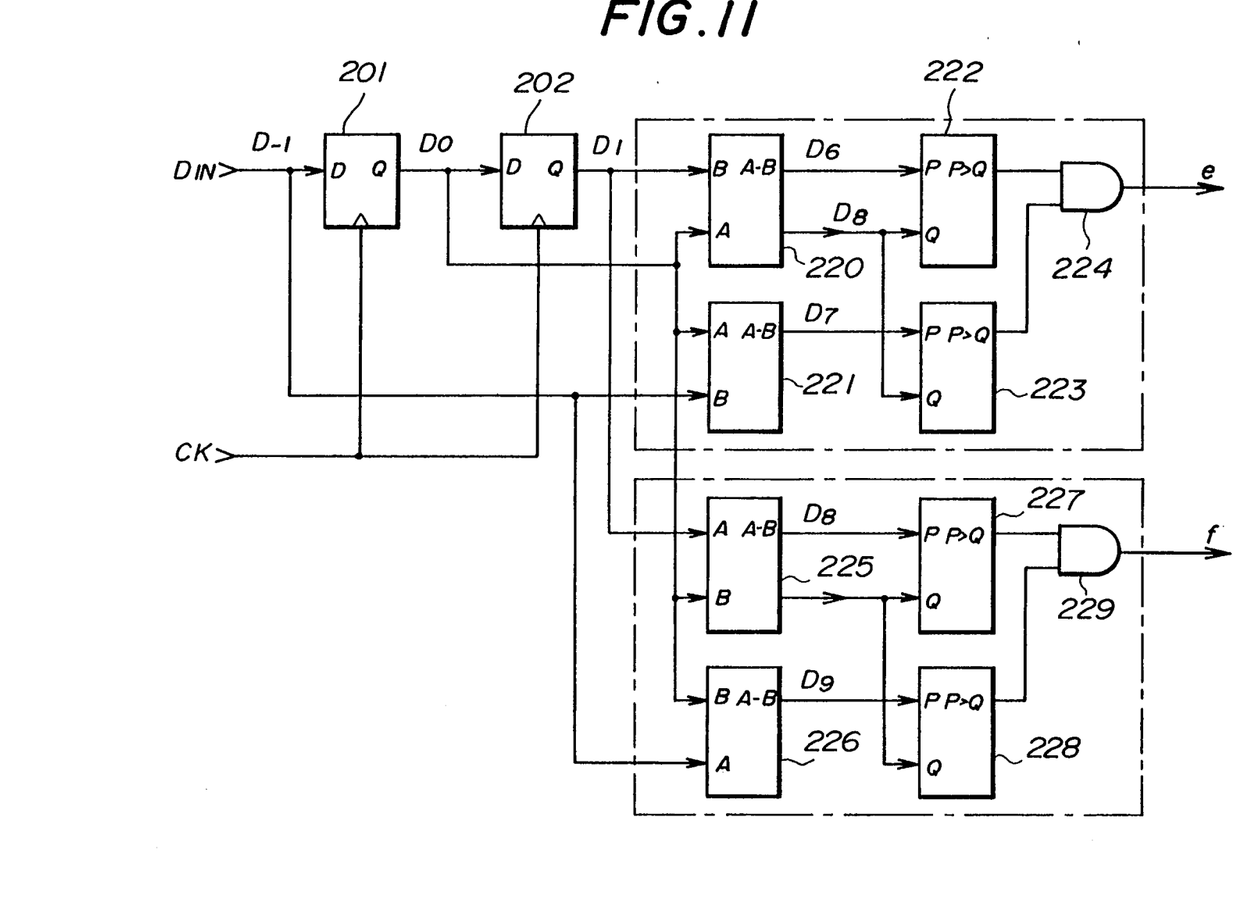
FIG. 11 is a diagram showing a peak detector provided in the image processing apparatus of the present invention.

Next, a description will be given of another peak detector in the image processor with reference to FIG. 11, instead of the peak and valley detectors of FIG. 6. FIG. 11 shows a peak detector including four subtracters 220, 221, 225, 226, four comparators 222, 223, 227, 228, and two AND circuits 224, 229. The other construction of the correction part in this embodiment is the same as that of the correction part 250 of FIG. 6, and the corresponding parts of the correction part are designated by the same reference numerals.

In FIG. 11, the subtracters 220 and 221, the comparators 222 and 223, and the AND circuit 224 constitute a peak detector for detecting a peak of an image signal, while the subtracters 225 and 226, the comparators 227 and 228, and the AND circuit 229 constitute a valley detector for detecting a valley of an image signal. In the peak detector, the subtracter 220 outputs a signal D6 indicating a difference in gray level between two successive pixels indicated by signals D0 and D1 (D6=D0−D1), and the subtracter 221 outputs a signal D7 indicating a difference in gray level between two pixels indicated by signals D0 and D(−1) (D7=Do−D(−1)). The comparator 222 compares a value of data indicated by the signal D6 with a prescribed reference value Db, and outputs a signal at high level "1" to the AND circuit 224 when D6>Db. Similarly, the comparator 223 outputs a signal at high level "1" to the AND circuit 224 when D7>Db. The AND circuit 224 outputs the signal "e" at high level "1" to the shift register 210 when D6>Db and D7>Db, the signal "e" at high level "1" indicating that the peak level is detected. In other words, when both the gray level difference between a first pixel and a second pixel and the gray level difference between a second pixel and a third pixel are higher than the reference value, a peak of the image signal is detected. Thus, the accuracy of detecting the peak of the image signal is improved. The valley detector has features similar to those of the peak detector described above, a description thereof being omitted.

Further, the present invention is not limited to the above described embodiments, and variations and modifications may be made without departing from the scope of the present invention.

What is claimed is:

1. An image processing apparatus in which a multilevel image signal generated from an original image by means of a scanner is input and processed so as to produce a set of multilevel image data describing a gray level of each pixel of an output image, said image processing apparatus comprising:
   detection means for repeatedly detecting a peak of said multilevel image signal and a valley thereof with respect to pixels of the original image aligned in a scanning direction of the scanner, and for outputting the detected peak of said multilevel image signal and the detected valley thereof;
   correction means for correcting a gray level of the multilevel image data with respect to each of said pixels depending on a difference between the peak and the valley output by said detection means, so as to reduce changes in gray level of pixels of the output image; and
   delay means for delaying the output of the detected peak and valley by said detection means until a prescribed number of pixels aligned in the scanning direction is received by said delay means.

2. An image processing apparatus according to claim 1, wherein an amount of the correction of the gray level by said correction means is in inverse proportion to a value of the difference between the detected peak and the detected valley.

3. An image processing apparatus according to claim 1, wherein said correction means decreases a gray level of the multilevel image data with respect to a corresponding pixel when a valley of the multilevel image signal is detected within a prescribed number of pixels of the original image aligned in the scanning direction, and when a peak of the multilevel image signal is detected within the prescribed number of the pixels said correction means increases a gray level of the multilevel image data with respect to a corresponding pixel, thus reducing changes in gray level of pixels of the output image.

4. An image processing apparatus according to claim 1, wherein a gray level of the multilevel image data is corrected by said correction means depending on the difference between a peak of the multilevel signal and a valley thereof only when both the peak and the valley are detected by said detection means within a prescribed number of pixels of the original image aligned in the scanning direction.

5. An image processing apparatus according to claim 1, wherein said correction means does not correct a gray level of the multilevel image signal either when no peak is detected by said detection means within a prescribed number of pixels of the original image aligned in the scanning direction or when no valley is detected within the prescribed number of the pixels.

6. An image processing apparatus according to claim 1, further comprising control means for allowing said correction means to correct a gray level of the multilevel image data only when both the peak and the valley are detected by said detection means within a prescribed number of pixels of the original image aligned in the scanning direction.

7. An image processing apparatus according to claim 6, wherein said control means makes said correction means unable to correct the gray level of the multilevel image data either when no peak of the multilevel image signal is detected within the prescribed number of the pixels or when no valley thereof is detected within the prescribed number of the pixels.

8. An image processing apparatus according to claim 1, further comprising control means for allowing said correction means to correct a gray level of the multilevel image data for a time period during which the outputting of the detected peak and valley is delayed by said delay means.

9. An image processing apparatus according to claim 1, further comprising storage means for temporarily storing values of the detected peak and valley output by said detection means until a new peak of said multilevel image signal detected by said detection means and a new valley thereof are received from said detection means.

10. An image processing apparatus according to claim 1, further comprising area detection means, coupled to said correction means, for detecting whether or not a screened halftone area of the original image is represented by the multilevel image signal, and control means for allowing said correction means to correct a gray level of the multilevel image data when it is detected that the screened halftone area is represented by the multilevel image signal.

11. An image processing apparatus according to claim 1, further comprising average means, coupled to said correction means, for supplying an average of gray levels with respect to a number of pixels adjacent to a pixel corresponding to either the peak or the valley detected by said detection means, wherein said correction means corrects a gray level of the multilevel image data depending on the difference between the peak and the valley output by said detection means and depending on the average of gray levels supplied by said average means, so as to reduce changes in gray level of pixels of the output image.

12. An image processing apparatus according to claim 11, wherein an amount of the correction by said correction means is in inverse proportion to a value of the difference between the peak of the multilevel image signal and the valley thereof.

13. An image processing apparatus in which a multilevel image signal generated from an original image by a scanner is input and processed so as to produce multilevel image data describing a gray level of each pixel of an output image, said image processing apparatus comprising:

detection means for repeatedly detecting a peak of said multilevel image signal with respect to pixels of the original image aligned in a scanning direction of the scanner, and for outputting the peak of said multilevel image signal;

delay means for delaying said outputting of said peak by said detection means until a prescribed number of pixels aligned in the scanning direction is received by said delay means;

storage means for temporarily storing a value of a peak previously output by said detection means until a new peak of said multilevel image signal currently detected by said detection means is received; and correction means for correcting a gray level of the multilevel image data corresponding to the new peak of the multilevel image signal depending on said previous peak stored in said storage means and depending on said new peak output by said detection means, so as to reduce changes in gray level of pixels of the output image.

* * * * *